US007747629B2

(12) United States Patent
Iyengar et al.

(10) Patent No.: US 7,747,629 B2
(45) Date of Patent: Jun. 29, 2010

(54) SYSTEM AND METHOD FOR POSITIONAL REPRESENTATION OF CONTENT FOR EFFICIENT INDEXING, SEARCH, RETRIEVAL, AND COMPRESSION

(75) Inventors: Giridharan Iyengar, Nanuet, NY (US); Ganesh N. Ramaswamy, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 11/508,642

(22) Filed: Aug. 23, 2006

(65) Prior Publication Data
US 2008/0059488 A1 Mar. 6, 2008

(51) Int. Cl.
G06F 3/00 (2006.01)
G06F 3/048 (2006.01)
G06F 7/00 (2006.01)
G06F 17/30 (2006.01)

(52) U.S. Cl. .................... 707/741; 707/769; 715/721; 715/764

(58) Field of Classification Search .................. 707/3, 707/102, 741, 769; 715/721, 764
See application file for complete search history.

(56) References Cited

U.S. PATENT DOCUMENTS

| 5,440,730 | A | * | 8/1995 | Elmasri et al. | 707/203 |
|---|---|---|---|---|---|
| 5,729,471 | A | * | 3/1998 | Jain et al. | 725/131 |
| 5,845,301 | A | * | 12/1998 | Rivette et al. | 715/210 |
| 6,157,901 | A | * | 12/2000 | Howe | 703/2 |
| 6,212,494 | B1 | * | 4/2001 | Boguraev | 704/9 |
| 6,377,946 | B1 | * | 4/2002 | Okamoto et al. | 707/5 |
| 6,473,752 | B1 | * | 10/2002 | Fleming, III | 707/4 |
| 6,549,922 | B1 | * | 4/2003 | Srivastava et al. | 707/205 |
| 7,010,751 | B2 | * | 3/2006 | Shneiderman | 715/232 |
| 7,139,752 | B2 | * | 11/2006 | Broder et al. | 707/4 |
| 7,319,994 | B1 | * | 1/2008 | Sercinoglu | 707/2 |
| 7,392,466 | B2 | * | 6/2008 | Pan et al. | 715/200 |
| 2002/0083079 | A1 | * | 6/2002 | Meier et al. | 707/104.1 |
| 2004/0161150 | A1 | * | 8/2004 | Cukierman et al. | 382/186 |
| 2005/0234891 | A1 | * | 10/2005 | Walther et al. | 707/3 |
| 2006/0277481 | A1 | * | 12/2006 | Forstall et al. | 715/764 |

OTHER PUBLICATIONS

Gupta et al., Semantic Queries with Pictures: The Visual Information Management System Model, 1991, Proceedings of the 17th International Conference on Very Large Data Bases, pp. 69-79.*

* cited by examiner

Primary Examiner—James Trujillo
Assistant Examiner—Jorge A Casanova

(57) ABSTRACT

A method of generating a positional representation of a document, including identifying each unique term in a document and positions in the document at which the unique term appears, and for the each unique term, storing positional information derived from the positions into a positional representation.

12 Claims, 6 Drawing Sheets

Document #1

Sally sells seashells by the seashore. She sells seashells on the seashell shore.
The seashells she sells are seashore shells,
Of that I'm sure.

FIG. 2a

| Term | Term Positions |
|---|---|
| sally | { 0 } |
| sells | {6, 43, 100 } |
| seashells | { 12, 49, 86 } |
| by | { 22 } |
| the | {25, 62 } |
| seashore | { 29, 110 } |

FIG. 2b

| Term | First Term Position | Occurrence Offsets |
|---|---|---|
| sally | 0 | { } |
| sells | 6 | { +37, +57 } |
| seashells | 12 | { +37, +37 } |
| by | 22 | { } |
| the | 25 | { +37 } |
| seashore | 29 | { +82 } |

FIG. 2c

SYSTEM AND METHOD FOR POSITIONAL REPRESENTATION OF CONTENT FOR EFFICIENT INDEXING, SEARCH, RETRIEVAL, AND COMPRESSION

TECHNICAL FIELD OF THE INVENTION

The present invention relates generally to systems and methods for computerized searching in large bodies of textual data.

BACKGROUND

Modern search engines ranging from the ones that power internet search sites such as Google, MSN and open source such as Lucene have become extremely useful tools for rapidly locating information documents, and multimedia content from a variety of sources. A typical modern search engine builds an index representation of terms in a document to locate relevant documents. This index representation can be thought of as a lookup table which locates a set of documents relevant to a particular search term. This lookup table is ordered sequentially for all the search terms and each entry in this table consists of one search term and all documents relevant to that search term. Given a search term, locating this entry in the lookup table returns a list of relevant documents. Similarly, combinations of search terms can be handled using a union or set intersection of entry lookups. This index representation is generally known as an inverted index.

In the case of web searches and homepage searches, locating a document is all that is desired and there is no need to additionally locate the search terms within the document itself. However, in the case of multi-page or voluminous documents such as user manuals, programming guides, etc., or multimedia (video and audio files) which span several minutes, it becomes important to not only locate the document relevant to a given search query, but also the appropriate location of the search term within the document itself. For example, if a user wants to locate news broadcasts on a particular sporting event, the user would not only like to access the relevant broadcasts, but also the precise time slot within such a broadcast where the sporting event was mentioned. Similarly, for user manuals, the relevant search terms might be located deep within the document and it would be ideal to be able to jump directly to the exact location of the term in the document.

The typical solution to this problem is to either split the document into many-documents and index each of these sub-documents individually or scan the document linearly to locate the search terms within the document after they have been identified as relevant. However, splitting the document results in significant loss of contextual information due to an arbitrary chunking of documents into sub-documents. Further, the cost of a linear scan is prohibitive, especially when there are multiple matching documents and the length of each document is large (e.g. 1000 page pdf documents are not uncommon these days).

An additional problem is that during indexing, and re-indexing, a searching application typically scans the document and creates and inverted word index to internally represent the document. This process is fairly expensive, especially for applications where new documents are continually added requiring regularly scheduled re-indexing of documents.

There is a need for a positional representation of data that makes possible efficient indexing of documents and retrieval of searched information.

SUMMARY OF THE INVENTION

According to an exemplary embodiment of the present invention, a method of generating a positional representation of a document is provided. The method includes identifying unique terms in a document and determining positions in the document at which each of the unique terms appear, and for each of the unique terms, storing positional information derived from the positions into a positional representation.

According to an exemplary embodiment of the present invention, a computer readable medium is provided including computer code for generating a positional representation of a document. The computer readable medium includes computer code for identifying each of the unique terms in the document and determining positions in the document at which each of the unique terms appear, and for each of the unique terms, computer code for storing positional information derived from the positions into a positional representation.

According to an exemplary embodiment of the present invention, a method is provided for generating an inverted index from a positional representation of a document. The method includes the steps of inputting a positional representation of a document having a document identifier and positional records, wherein the positional records include a term of the document and occurrence positions of the term in the document, generating an entry for each of the positional records, wherein the entry includes the term and a document record, wherein the document record includes the document identifier and the occurrence positions, and inserting the entry into an inverted index.

According to an exemplary embodiment of the present invention, an apparatus is provided for generating a positional representation of a text document. The apparatus includes a processor for converting a document to a positional representation by extracting each of the unique terms from the document and their respective occurrence positions in the document, generating entries for each of the unique terms which include a first one of the unique terms and a set of the occurrence positions corresponding to the first one of the unique terms, and adding each of the entries to a positional representation.

These and other exemplary embodiments, aspects, features and advantages of the present invention will be described or become more apparent from the following detailed description of exemplary embodiments, which is to be read in connection with the accompanying figures.

BRIEF DESCRIPTION OF THE DRAWINGS

FIG. 2a illustrates an example of the document referenced in FIG. 1;

FIG. 2b illustrates an exemplary embodiment of a positional representation generated from the document of FIG. 2a according to the method of FIG. 1;

FIG. 2c illustrates an exemplary embodiment of a positional representation generated from the document of FIG. 2a according to the method of FIG. 1.

DETAILED DESCRIPTION OF EXEMPLARY EMBODIMENTS

In general, exemplary embodiments of the invention as described in further detail hereafter include systems and methods for providing an efficient technique of organizing documents prior to indexing by a search engine. This facilitates seeking the exact location of a search term once a relevant document has been located by making use of a positional representation of a document. The positional representation also facilitates efficient inverted indexing of documents by search engines. In addition, the positional representation greatly simplifies the computation of the inverted index, making it compatible with the native indexing structures used by state-of-the-art search engines. Positional representations of documents are equivalent lossless representations of those documents. The positional representations are essentially compressed versions of the original documents and typically occupy less memory than the original documents, resulting in reduced storage requirements.

Exemplary systems and methods for organizing documents prior to indexing by a search engine will now be discussed in further detail with reference to illustrative embodiments of FIGS. 1-3b. It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
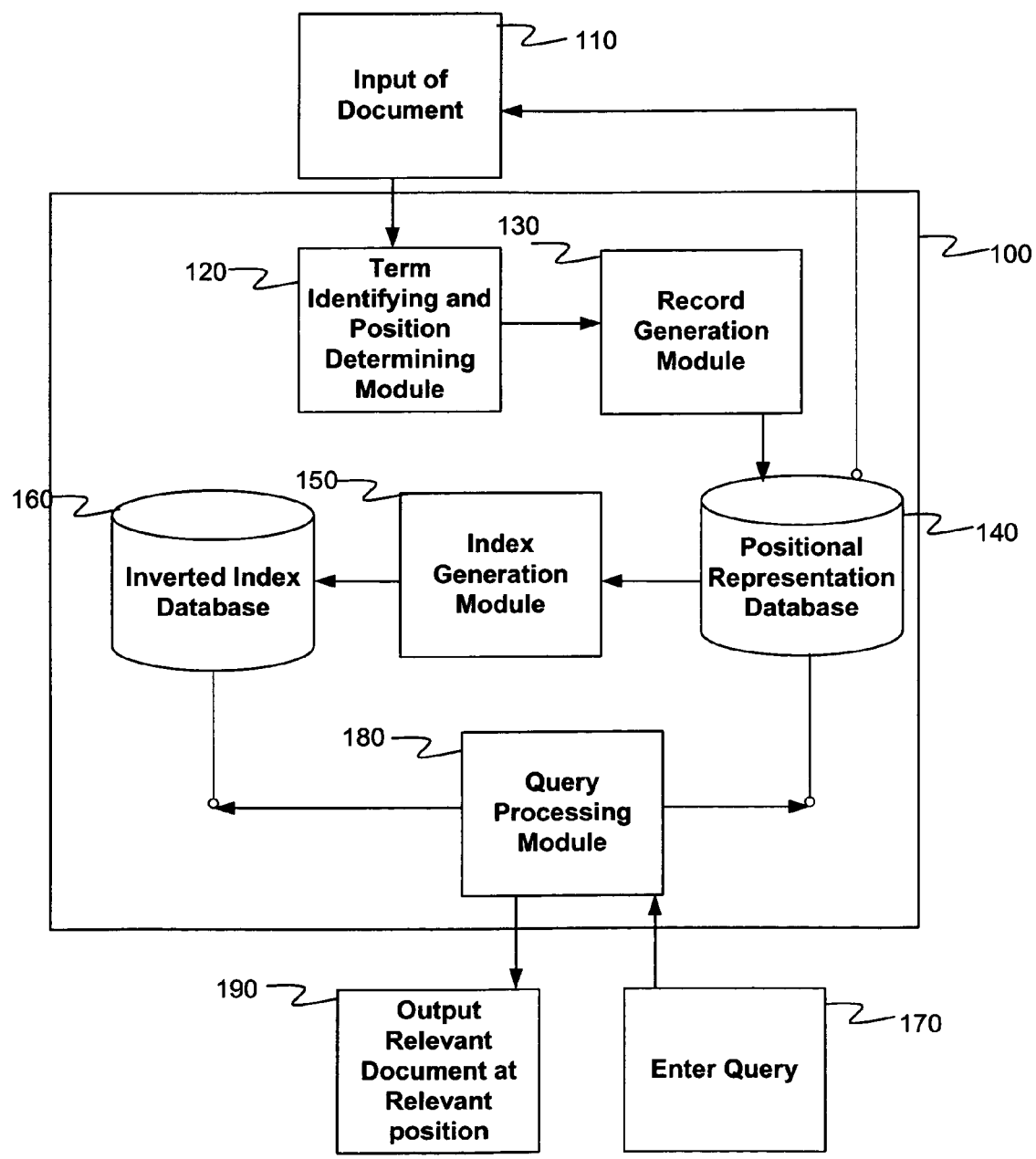
FIG. 1 is a high-level block diagram of a system for organizing documents prior to indexing by a search engine according to an exemplary embodiment of the invention.

FIG. 1 is a high-level block diagram of a system (100) for organizing documents prior to indexing by a search engine according to an exemplary embodiment of the invention. In general, the system (100) comprises a term identifying and position determining module (120), a record generation module (130), a positional representation database (140), an index generation module (150), an inverted index database (160), and a query processing module (180).

A document is input (110) into the system (100) and is passed to the term identifying and position determining module (120) which identifies all of the unique terms in the document and their respective positions. The unique terms may be one or more words or an annotation. This information is passed to the record generation module (130) which builds a record for each of the unique terms having positional information derived from the respective positions. The record generation module (130) combines the records into a positional representation data structure and stores the data structure into the positional representation database (140). Additional documents are input (110) as necessary, each creating a new entry in the positional representation database (140). The index generation module (150) processes the positional representations stored in the positional representation database (140) to generate an inverted index.

In a typical inverted index, for each term, a list of documents in which that term appears is stored. The inverted index is often generated by traversing directly through each of the documents. However, generating the inverted from positional representations of those documents is less time consuming because each positional representation is smaller and better organized than the original document.

The inverted index is stored in the inverted index database (160). When a user enters a search query (170), the query processing module receives the query, and retrieves the inverted index from the inverted index database (160). The query processing module (160) traverses the inverted index until it determines a document is most relevant to the entered query, retrieves the positional representation that corresponds to the document from the positional representation database (140) and returns the relevant document, advanced to a relevant position (190) based on the retrieved positional representation.

FIG. 2a illustrates an example of the document referenced in FIG. 1. Referring to FIG. 2a, unique terms appearing in the first sentence of the document are the terms 'Sally', 'sells', 'seashell', 'by', 'the', and 'seashore'. In the second sentence of the document, the occurrence of the term 'She' is also a unique term because it has not already appeared. However, the term 'sells' in the second sentence is merely a subsequent occurrence of a unique term because it has appeared previously in the first sentence. In exemplary embodiments of the present invention, the document may be an electronic document in various formats including but not limited to a portable document format (PDF), Microsoft Word (MS-Word), HyperText Markup Language (HTML), etc. In addition, the document may be a multimedia document and include formats such as Movie Pictures Experts Group (MPEG), Waveform Audio Format (WAV), Audio Video Interleave (AVI), Joint Photographic Experts Group (JPEG), etc.

FIG. 2b illustrates an exemplary embodiment of a positional representation generated from the document of FIG. 2a according an exemplary embodiment of the present invention.

Referring to FIG. 2b, the number of entries in the positional representation corresponds to the number of unique terms found in the document. For ease of discussion, the figure only lists a portion of the unique terms present in the document, namely those found in the first sentence of the document. Each of the entries contains a unique term of the document and positions which correspond to each occurrence of the unique term in the document. As an example, referring to FIG. 2a and FIG. 2b, the first occurrence of the unique term 'sells' begins at character position 6 in the document. Subsequent occurrences of the unique term begin at character position 43 and 100 in the document.

FIG. 2c illustrates an exemplary embodiment of a positional representation generated from the document of FIG. 2a according to an exemplary embodiment of the present invention.

Referring to FIG. 2c, the number of entries in the positional representation corresponds to the number of unique terms found in the document. For ease of discussion, the figure only lists a portion of the unique terms present in the document, namely those found in the first sentence of the document. Each of the entries contains a unique term of the document, a position that the unique term first appears in the document, and a series of subsequent occurrence offsets for all later occurrences of the unique term in the document. The subsequent occurrence offsets are relative to a prior occurrence position of the unique term in the document. The subsequent occurrence offsets may be computed by subtracting a prior occurrence position from a subsequent occurrence position. As an example, the unique term 'sells' appears for the first time at character position 6, and at a subsequent position of 43, resulting in a subsequent occurrence offset of +37. A positional representation having offsets may be desirable when character positions become very large. Offsets will typically result in smaller numbers, requiring less memory. In many respects, the position that the unique term first appears in the document is nothing more than an offset from character position 0, and thus a positional representation be made entirely of offsets.

The positional representations embodied in FIG. 2b and FIG. 2c may also include an additional column which lists the total occurrences of each unique term in the document. The total occurrences may then be used later by a search engine to determine the most relevant document of those returned by a particular query.

The positional representations embodied in FIG. 2b and FIG. 2c may also include a document identifier which is representative of the document the positional representation was generated from. The document identifier may be the name of the document. The document identifier may also be an identifier number of an entry in a lookup table having the path of the document.

The positional representations may be stored in a database, main memory, cache, hard disk, etc. When a positional representation is stored as a file, the filename may correspond to the document the positional representation was converted from. As an example, the document having filename 'text.pdf' may be converted into a positional representation having filename 'text.pdf.pr'. Since the original file name can be discerned from filename of the positional representation, the positional representation need not contain a document identifier.

A positional representation may also include annotations from the document. An annotation is extra information associated with a particular point in a document or a particular section, sentence, term, image, audio clip, video clip, etc., and is typically not visible to a user unless specifically requested. As an example, the term 'Sally' in FIG. 2a, could have an annotation of 'Person' attached to it. As a further example, a multimedia document could have an embedded jpeg image of a painting with an annotation of 'Mona Lisa' attached to it. Since annotations are essentially hidden terms, the annotations and their positions can be determined and stored in the positional representation like the unique terms.

Multimedia documents may contain a mixture of text along with embedded images, audio clips, video, etc. For these documents, an XML descriptor or similar format descriptor in addition to the source document is typically created. The descriptor is the one that is typically indexed by the search engines rather than the source itself. For a multimedia document, the positional representation is generated from the XML descriptor instead of the document.

Annotations become especially important in multimedia documents since although much of the document may be in binary, it may be interspersed with annotations that identify frames or scenes. A conventional search for a particular actor might return a relevant multimedia document, but not where in the document the actor appears. The times that the actor appears in the movie can be derived from the positions of the annotations.

Figure 3A:
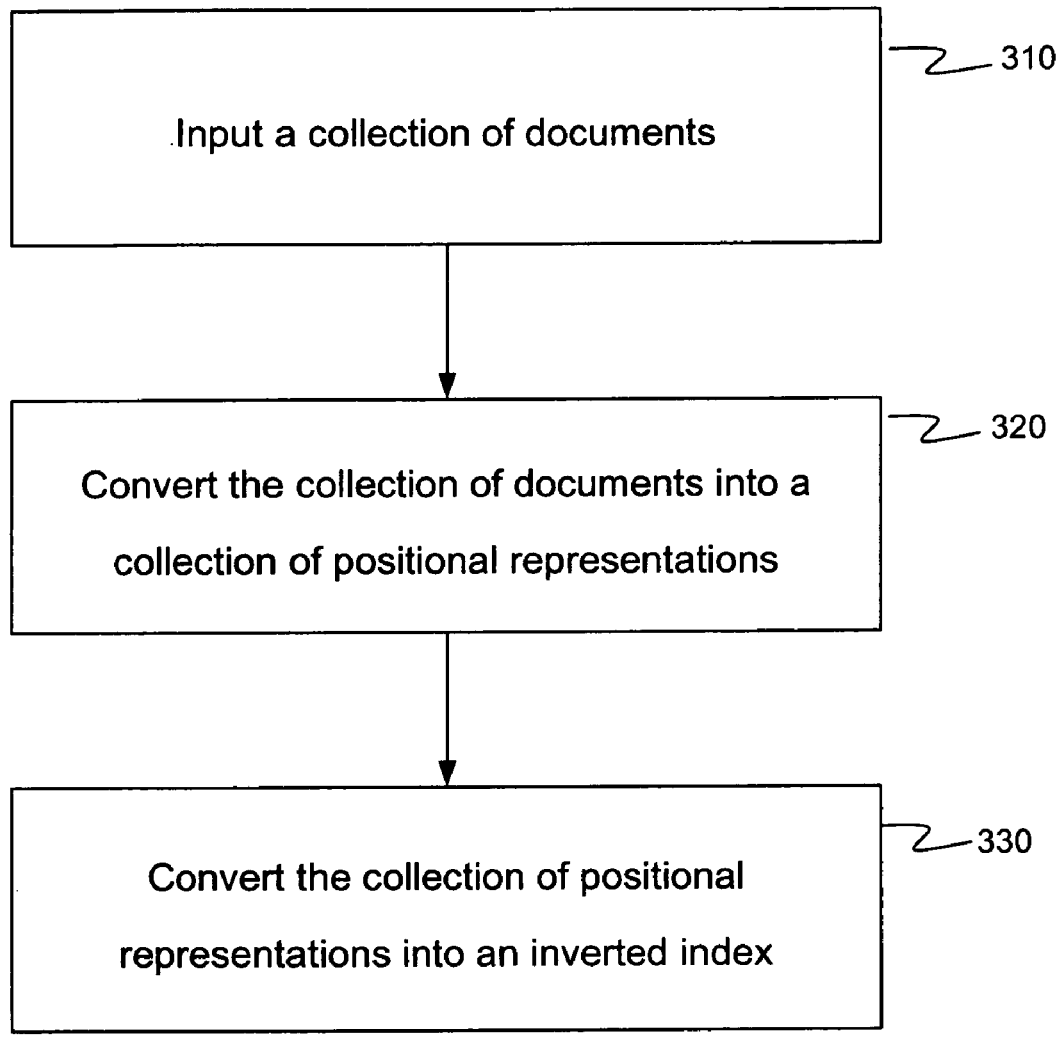
FIG. 3a and FIG. 3b illustrate generation of an inverted index from a collection of positional representations according to an exemplary embodiment of the present invention.
Figure 3B:
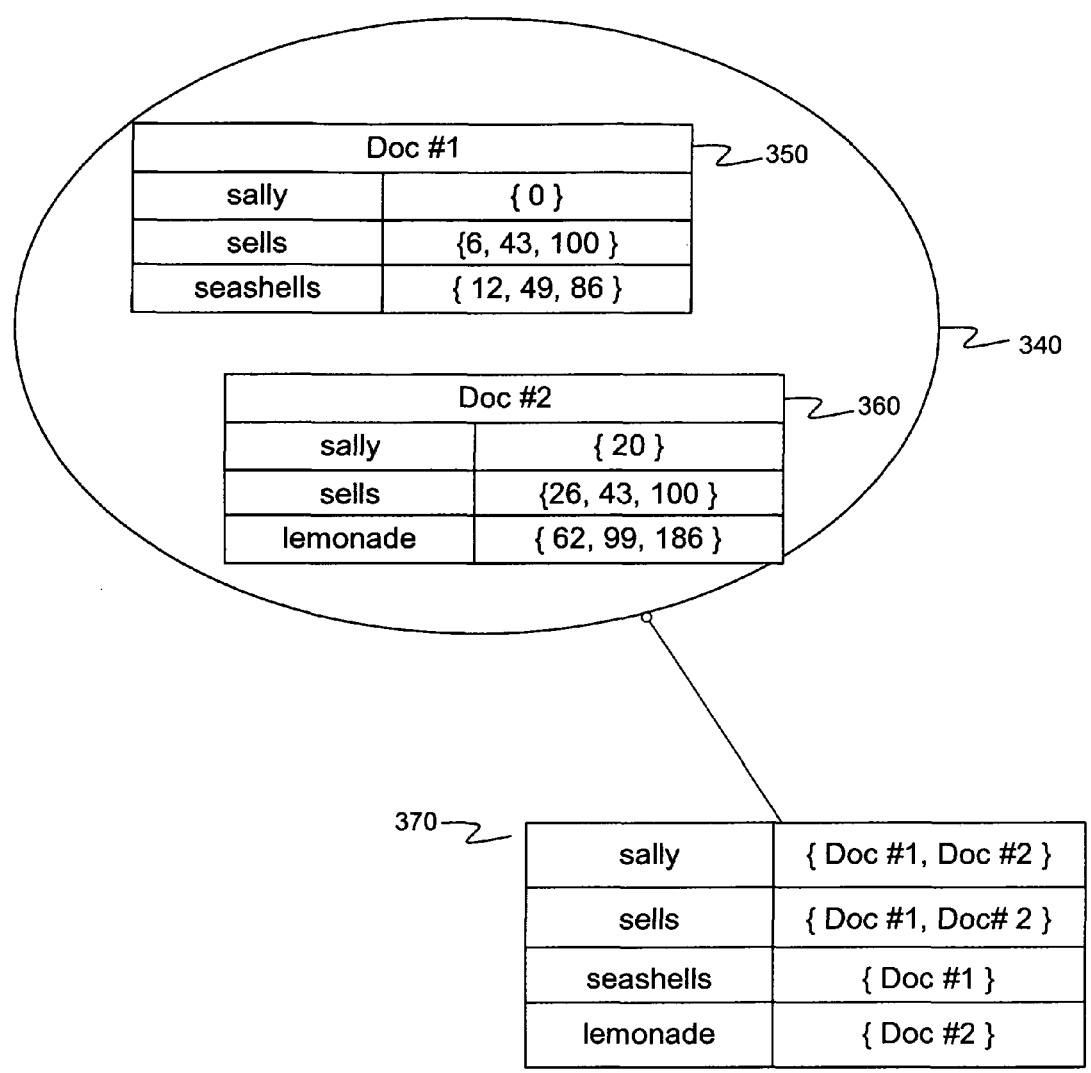

FIG. 3a and FIG. 3b illustrate generation of an inverted index from a collection of positional representations according to an exemplary embodiment of the present invention.

FIG. 3a, illustrates how the inverted index is generated using a flowchart. In a first step, a collection of documents are input 310. In a second step, each of the documents in the collection are converted to a positional representation 320. In a final step the resulting positional representations are used to generate an inverted index 330. FIG. 3b illustrates an exemplary inverted index generated from exemplary positional representations according to an exemplary embodiment of the present invention. Referring to FIG. 4b, a collection of positional representations 340 comprises a first positional representation 350 and a second positional representation 360. The first positional representation 350 has a document identifier of Doc #1 and three terms unique to document Doc #1, namely 'sally', 'sells', and 'seashells'. The second positional representation 360 has a document identifier of Doc #2 and three terms unique to document Doc#2, namely 'sally', 'sells', and 'lemonade'. The resulting inverted index 370 includes entries for the combined unique terms present in both positional representations, namely 'sally', 'sells', seashells, and 'lemonade'. Each entry also contains a corresponding document identifier of where the unique term is present. Each entry in the inverted index, along with the document identifier, may also contain the positional information stored in the positional representation associated with the document identifier.

The inverted index 370 can then be used with any search application such as a search engine or search middleware to retrieve documents relevant to an entered query. Once a user enters a search term, a search engine can traverse through the entries in the inverted index. Upon finding a matching entry in the inverted index for the search term, documents relevant to the search term can be identified and potentially viewed by the user. When one of the relevant documents is not readily available in its original form, it can be re-created by translating its positional representation. Since all of the unique terms and their positions are known, it is a trivial matter for an application do the translation.

When a relevant document is displayed, the presentation of the document can be automatically advanced to any of the occurrences of the search time by using the positional information stored in the positional representation of the relevant document. As an example, a lengthy document having several occurrences of the search term 'spinal meningitis' could be automatically scrolled to the first or subsequent occurrence of the term. When the relevant document is a multimedia document, the presentation of the document in time can be advanced to the location of the search term. As an example, an mpeg movie document having an occurrence of an annotation of 'finale' could automatically be advanced to the finale in the movie.

According to an exemplary embodiment of the present invention an apparatus is provided that includes a processor for converting a document to a positional representation. The processor extracts each of the unique terms from the document and their respective occurrence positions in the document. The processor next generates entries for each of the unique terms. Each of the entries includes a unique term and positional information which can be used to derive the positions where that unique term appears in the document. The positional information may be the positions of the unique terms, offsets of occurrences of the unique terms or some combination thereof. Once the processor has completed generation of the entries, it combines the entries into a data structure known as a positional representation. The positional representation may also include a document identifier to identify the document the positional representation was derived from.

In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of advancing within a video clip of a multimedia document, the method comprising:
    searching first entries of an inverted index for a first annotation matching a query, each first entry having a unique first annotation and a list of document identifiers of multimedia documents having the unique first annotation;
    upon determining the matching first annotation, searching second entries of a positional representation corresponding to one of the document identifiers for a second annotation matching the query, each second entry having a unique second annotation and occurrence positions of the unique second annotation within a multimedia document;
    upon determining the matching second annotation, deriving a time within the video clip of the multimedia document corresponding to the one document identifier from an occurrence position of the second annotation, and advancing presentation of the video clip to the derived time,
    wherein the method is executed by a processor.

2. The method of claim 1, wherein the video clip is advanced to the derived time after a start of the video clip.

3. The method of claim 1, wherein the query specifies a proper name.

4. The method of claim 1, wherein the annotation is text displayed upon request.

5. The method of claim 1, wherein the positional representation includes third entries, each third entry including a unique term of always visible text and occurrence positions of the unique term within a multimedia document.

6. The method of claim 5, wherein the inverted index includes fourth entries, each fourth entry having a corresponding one of the unique terms and list of document identifiers of multimedia documents having the unique term.

7. A method of generating an inverted index for a collection of multimedia documents, the method comprising:
    generating a positional representation of each multimedia document, at least one entry of the positional representation including a unique annotation and at least one occurrence position within its corresponding multimedia document, wherein times within a video clip of the corresponding multimedia document are derivable from the occurrence position;
    determining for each unique annotation among the generated positional representations, the positional representations that contain the annotation; and
    creating an entry in the inverted index for each unique annotation among the generated positional representations including the annotation and document identifiers of the multimedia documents of the positional representations that contain the annotation,
    wherein the method is executed by a processor.

8. The method of claim 7, wherein at least one of the times is after the start of the video clip.

9. The method of claim 7, wherein the unique annotation for at least one of the positional representations corresponds to a proper name and at least one of the times corresponds to a time within the video clip in which a subject corresponding to the proper name appears.

10. The method of claim 7, wherein the annotation is text displayed upon request.

11. The method of claim 10, further comprising adding fourth entries to the inverted index, each fourth entry including a corresponding one of the unique terms and list of document identifiers of multimedia documents having the unique term.

12. The method of claim 7, further comprising adding third entries to each of the positional representations, each third entry including a unique term of always visible text and occurrence positions of the unique term in its corresponding multimedia document.

* * * * *